United States Patent
Briggs et al.

(10) Patent No.: US 10,443,407 B2
(45) Date of Patent: Oct. 15, 2019

(54) ACCELERATOR INSERT FOR A GAS TURBINE ENGINE AIRFOIL

(71) Applicant: General Electric Company, Schenectady, NY (US)

(72) Inventors: Robert David Briggs, West Chester, OH (US); Shawn Michael Pearson, Cincinnati, OH (US); Andrew David Kemp, Marienville, OH (US); Gulcharan Singh Brainch, West Chester, OH (US)

(73) Assignee: General Electric Company, Schenectady, NY (US)

( * ) Notice: Subject to any disclaimer, the term of this patent is extended or adjusted under 35 U.S.C. 154(b) by 851 days.

(21) Appl. No.: 15/043,900

(22) Filed: Feb. 15, 2016

(65) Prior Publication Data

US 2017/0234145 A1    Aug. 17, 2017

(51) Int. Cl.
*F01D 5/18* (2006.01)
*F01D 25/12* (2006.01)
*F01D 9/04* (2006.01)

(52) U.S. Cl.
CPC .......... *F01D 5/188* (2013.01); *F01D 9/041* (2013.01); *F01D 25/12* (2013.01); *F05D 2220/32* (2013.01); *F05D 2240/12* (2013.01); *F05D 2240/128* (2013.01); *F05D 2240/30* (2013.01); *F05D 2260/20* (2013.01); *F05D 2260/202* (2013.01); *F05D 2260/203* (2013.01); *F05D 2260/2212* (2013.01)

(58) Field of Classification Search
CPC .......... F01D 5/188; F01D 5/189; F01D 25/12; F01D 9/041; F05D 2240/12; F05D 2240/128; F05D 2240/30; F05D 2260/203; F05D 2260/221; F05D 2260/2212; F05D 2260/2214; F05D 2260/22141
See application file for complete search history.

(56) References Cited

U.S. PATENT DOCUMENTS 2,873,944 A * 2/1959 Wiese ................. F01D 5/189
                                                          416/92
3,540,810 A * 11/1970 Kercher ............. F01D 5/189
                                                          415/115

(Continued)

FOREIGN PATENT DOCUMENTS

EP         1156187 A2     11/2001
EP       2 159 376 A2      3/2010

(Continued)

OTHER PUBLICATIONS

Extended European Search Report and Opinion issued in connection with corresponding EP Application No. 7155650.9 dated Jul. 19, 2017.

*Primary Examiner* — Igor Kershteyn
*Assistant Examiner* — Christopher R Legendre
(74) *Attorney, Agent, or Firm* — McGarry Bair PC

(57) ABSTRACT

An apparatus for a gas turbine engine can include an airfoil having an interior. The interior can be separated into one or more cooling air channels extending in a span-wise direction. An accelerator insert can be placed in one or more cooling air channels to define a reduced cross-sectional area within the cooling air channel to accelerate an airflow passing through the cooling air channel.

29 Claims, 7 Drawing Sheets

(56) References Cited

U.S. PATENT DOCUMENTS

| | | | | |
|---|---|---|---|---|
| 3,782,852 | A * | 1/1974 | Moore | F01D 5/188 415/115 |
| 3,846,041 | A * | 11/1974 | Albani | B23P 15/04 416/96 A |
| 4,257,734 | A * | 3/1981 | Guy | F01D 9/041 415/115 |
| 4,312,624 | A | 1/1982 | Steinbauer, Jr. et al. | |
| 4,456,428 | A * | 6/1984 | Cuvillier | F01D 5/187 415/115 |
| 5,288,207 | A * | 2/1994 | Linask | F01D 5/187 416/97 R |
| 5,361,828 | A | 11/1994 | Lee et al. | |
| 5,584,651 | A | 12/1996 | Pietraszkiewicz et al. | |
| 5,738,493 | A | 4/1998 | Lee et al. | |
| 5,772,398 | A * | 6/1998 | Noiret | F01D 5/189 415/115 |
| 5,813,827 | A * | 9/1998 | Nordlund | F01D 5/18 415/115 |
| 6,200,087 | B1 * | 3/2001 | Tung | F01D 5/186 415/115 |
| 6,241,466 | B1 * | 6/2001 | Tung | F01D 5/186 415/115 |
| 6,435,813 | B1 | 8/2002 | Rieck, Jr. et al. | |
| 6,468,031 | B1 | 10/2002 | Yu et al. | |
| 6,874,988 | B2 * | 4/2005 | Tiemann | F01D 5/189 415/115 |
| 8,348,613 | B2 * | 1/2013 | Gregg | F01D 5/189 415/1 |
| 8,408,872 | B2 | 4/2013 | Briggs et al. | |
| 8,544,277 | B2 | 10/2013 | Johnson et al. | |
| 8,585,350 | B1 * | 11/2013 | Liang | F01D 5/189 415/115 |
| 8,790,073 | B2 | 7/2014 | Mugglestone | |
| 2010/0054915 | A1 * | 3/2010 | Devore | F01D 5/189 415/116 |
| 2013/0223987 | A1 | 8/2013 | Stafford et al. | |
| 2016/0102563 | A1 * | 4/2016 | Spangler | F01D 5/189 415/115 |
| 2017/0234145 | A1 * | 8/2017 | Briggs | F01D 5/188 415/115 |

FOREIGN PATENT DOCUMENTS

| | | | |
|---|---|---|---|
| EP | 2618056 A1 | 7/2013 | |
| GB | 1467483 A * | 3/1977 | F01D 5/188 |
| GB | 2 061 400 A | 5/1981 | |
| WO | 2015/184294 A1 | 12/2015 | |

* cited by examiner

ACCELERATOR INSERT FOR A GAS TURBINE ENGINE AIRFOIL

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine airfoils generally include one or more interior cooling passages for routing the cooling air through the airfoil to cool different portions such as the leading edge, trailing edge and tip of the blade. An insert can be placed in an airfoil to enhance the cooling or perform another function such as dust removal.

BRIEF DESCRIPTION OF THE INVENTION

In one aspect, embodiments of the invention relate to an airfoil for a gas turbine engine including an outer wall bounding an interior and defining a pressure side and a suction side extending axially between a leading edge and a trailing edge to define a chord-wise direction and extending radially between a root at a tip to define a span-wise direction. The airfoil further includes a channel defined in the interior extending in the span-wise direction and an accelerator insert located within the channel defining an airflow passage. The airflow passage includes a reduced cross-sectional area to accelerate an airflow within the passage.

In another aspect, embodiments of the invention relate to a nozzle assembly for a gas turbine engine including an outer band, and inner band disposed radially within the outer band, at least one vane extending between the outer and inner bands and defining a nozzle with the at least one vane having an interior chamber, a channel defined in the interior chamber extending at partially between the inner and outer bands, and an accelerator insert located within the channel and defining an airflow passage having a reduced cross-sectional area.

In yet another aspect, embodiments of the invention relate to an airfoil for a gas turbine engine having an outer wall enclosing an interior with a channel defined within the interior and having an airflow accelerator insert disposed within the channel to create a reduced cross-sectional airflow passage.

DESCRIPTION OF EMBODIMENTS OF THE INVENTION

Figure 1:
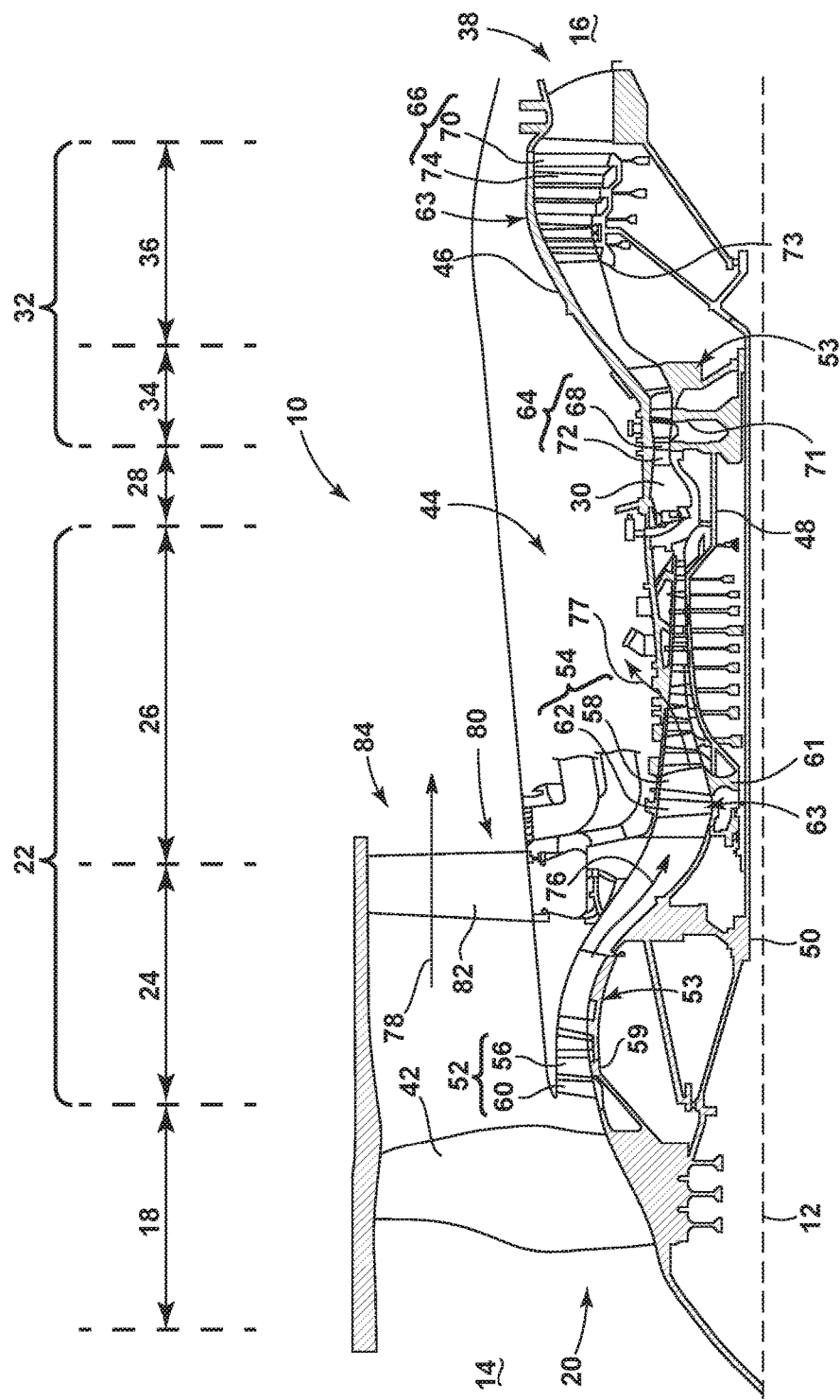
FIG. 1 is a schematic cross-sectional diagram of a gas turbine engine for an aircraft.

The described embodiments of the present invention are directed to an accelerator insert for use within an airfoil of a gas turbine engine. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 59, which is mounted to the corresponding one of the HP and LP spools 48, 50, with each stage having its own disk 59, 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine vanes 72, 74 can be provided in a ring and can extend radially outwardly relative to the centerline 12, while the corresponding rotating blades 68, 70 are positioned downstream of and adjacent to the static turbine vanes 72, 74 and can also extend radially outwardly relative to the centerline 12, from a blade platform to a blade tip. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having its own disk 71, 73. The vanes 72, 74 for a stage of the compressor can be mounted to the core casing 46 in a circumferential arrangement.

The portions of the engine 10 mounted to and rotating with either or both of the spools 48, 50 are also referred to individually or collectively as a rotor 53. The stationary portions of the engine 10 including portions mounted to the core casing 46 are also referred to individually or collectively as a stator 63.

In operation, the airflow exiting the fan section 18 is split such that a portion of the airflow is channeled into the LP compressor 24, which then supplies pressurized ambient air 76 to the HP compressor 26, which further pressurizes the ambient air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally the combustor 30 and components downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26. This fluid can be bleed air 77 which can include air drawn from the LP or HP compressors 24, 26 that bypasses the combustor 30 as cooling sources for the turbine section 32. This is a common engine configuration, not meant to be limiting.

Figure 2:
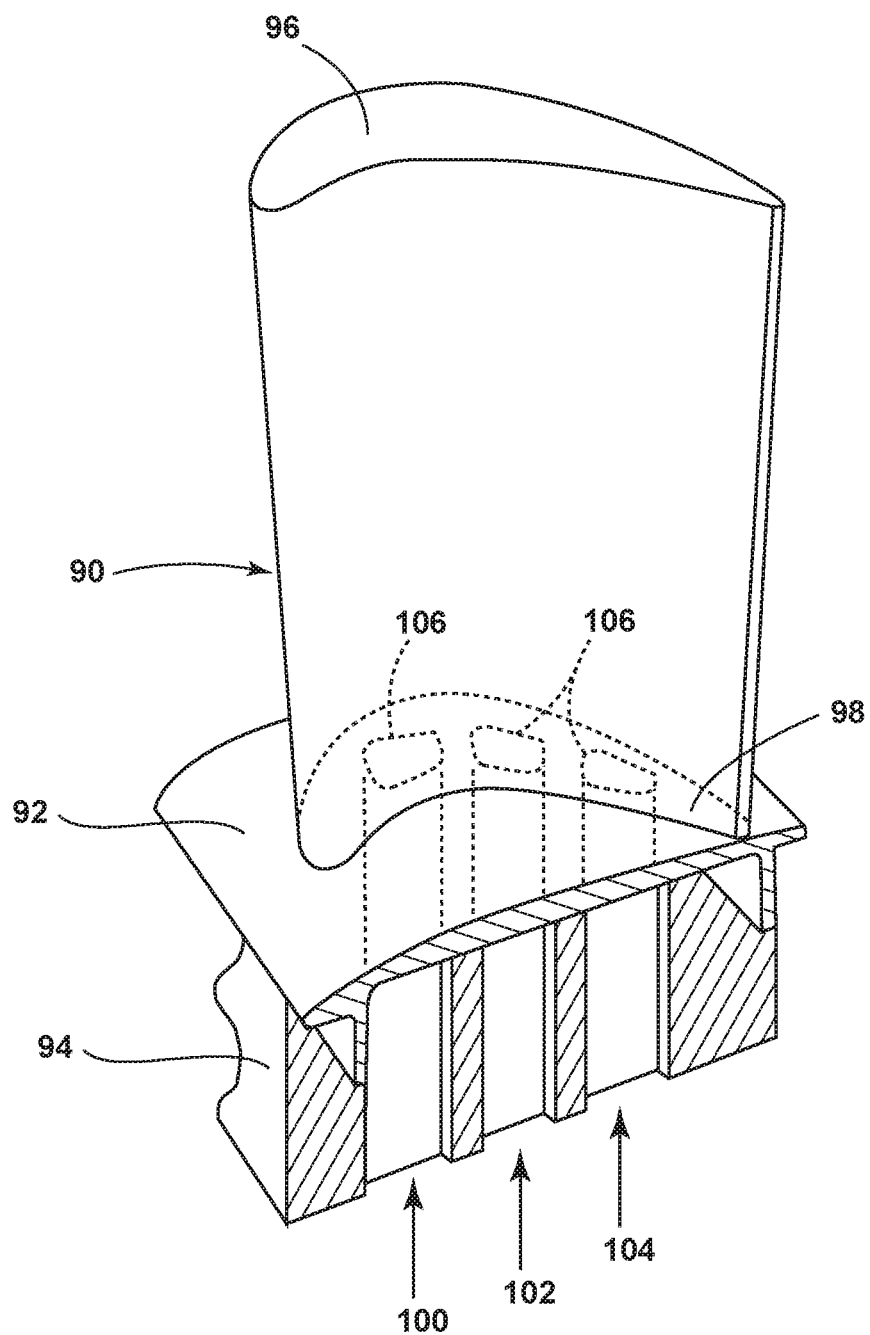
FIG. 2 is a perspective view of an airfoil in the form of a turbine blade of the engine of FIG. 1 with cooling air inlet passages.

FIG. 2 is a perspective view of an engine airfoil 90 which can be a blade or vane of the engine 10 from FIG. 1. The airfoil 90 mounts to a platform 92 coupled to a dovetail 94. The airfoil 90 extends from a tip 96 to a root 98. The platform 92 can be integral with the airfoil 78 at the root 98, which helps to radially contain the engine airflow. The dovetail 94 can be configured to mount to the rotor 51 on the engine 10 and have at least one inlet passage, exemplarily shown as a first inlet passage 100, a second inlet passage 102, and a third inlet passage 104, each extending through the dovetail 94 to provide internal fluid communication with the airfoil 78 at a passage outlet 106. It should be appreciated that the dovetail 94 is shown in cross-section, such that the inlet passages 100, 102, 104 are housed within the body of the dovetail 94.

Figure 3:
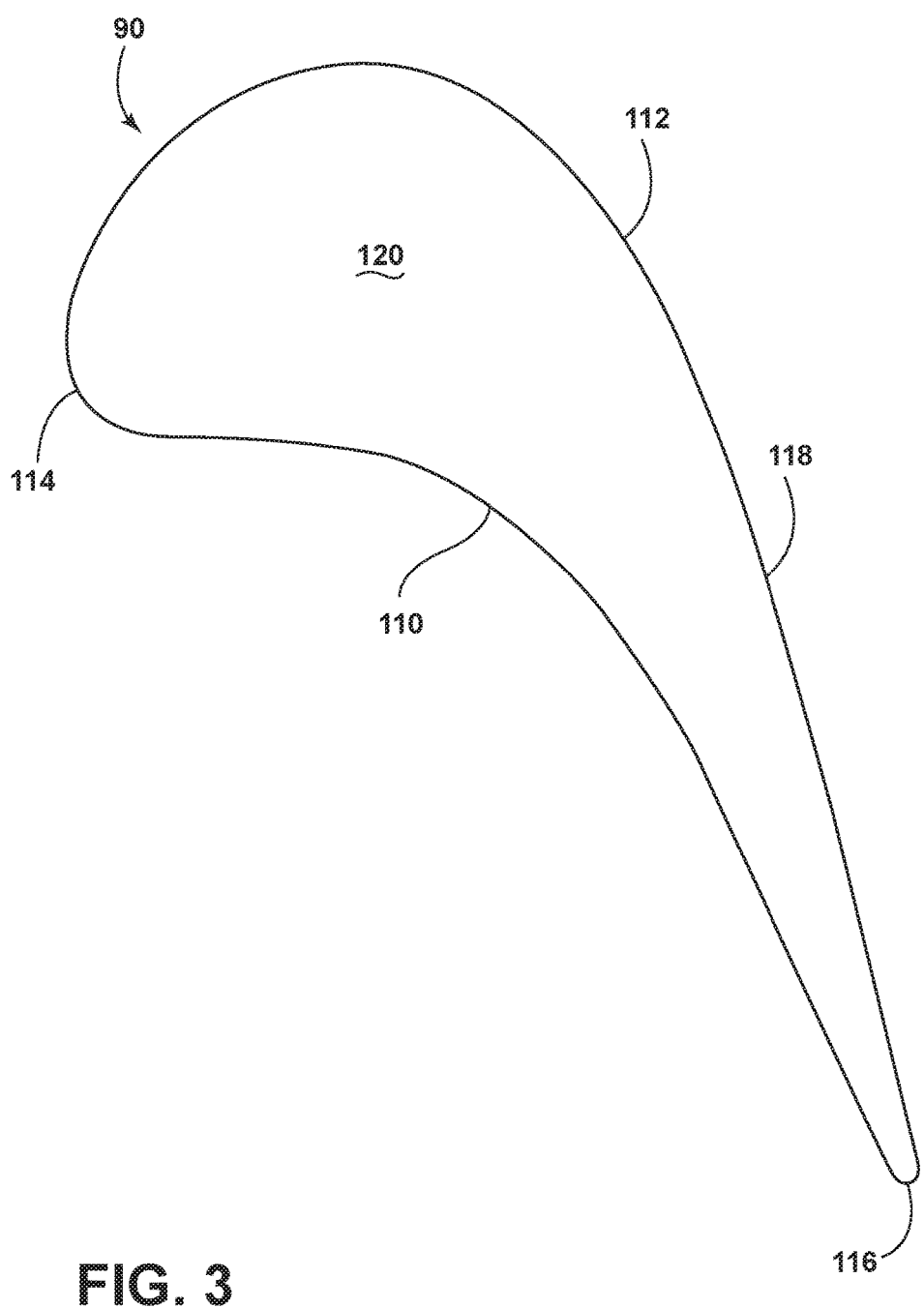
FIG. 3 is a cross-sectional view of the airfoil of FIG. 2.

Turning to FIG. 3, the airfoil 90, shown in cross-section, has a concave-shaped pressure sidewall 110 and a convex-shaped suction sidewall 112 with a leading edge 114 and a trailing edge 116 defining a chord-wise direction therebetween. The pressure and suction sidewalls 110, 112 define an outer wall 118 bounding an interior 120. The airfoil 90 as a blade 68, rotates in a direction such that the pressure sidewall 110 follows the suction sidewall 112. Thus, as shown in FIG. 3, the airfoil 78 would rotate upward toward the top of the page. As a stationary vane 72, the airfoil 90 would not rotate.

Figure 4:
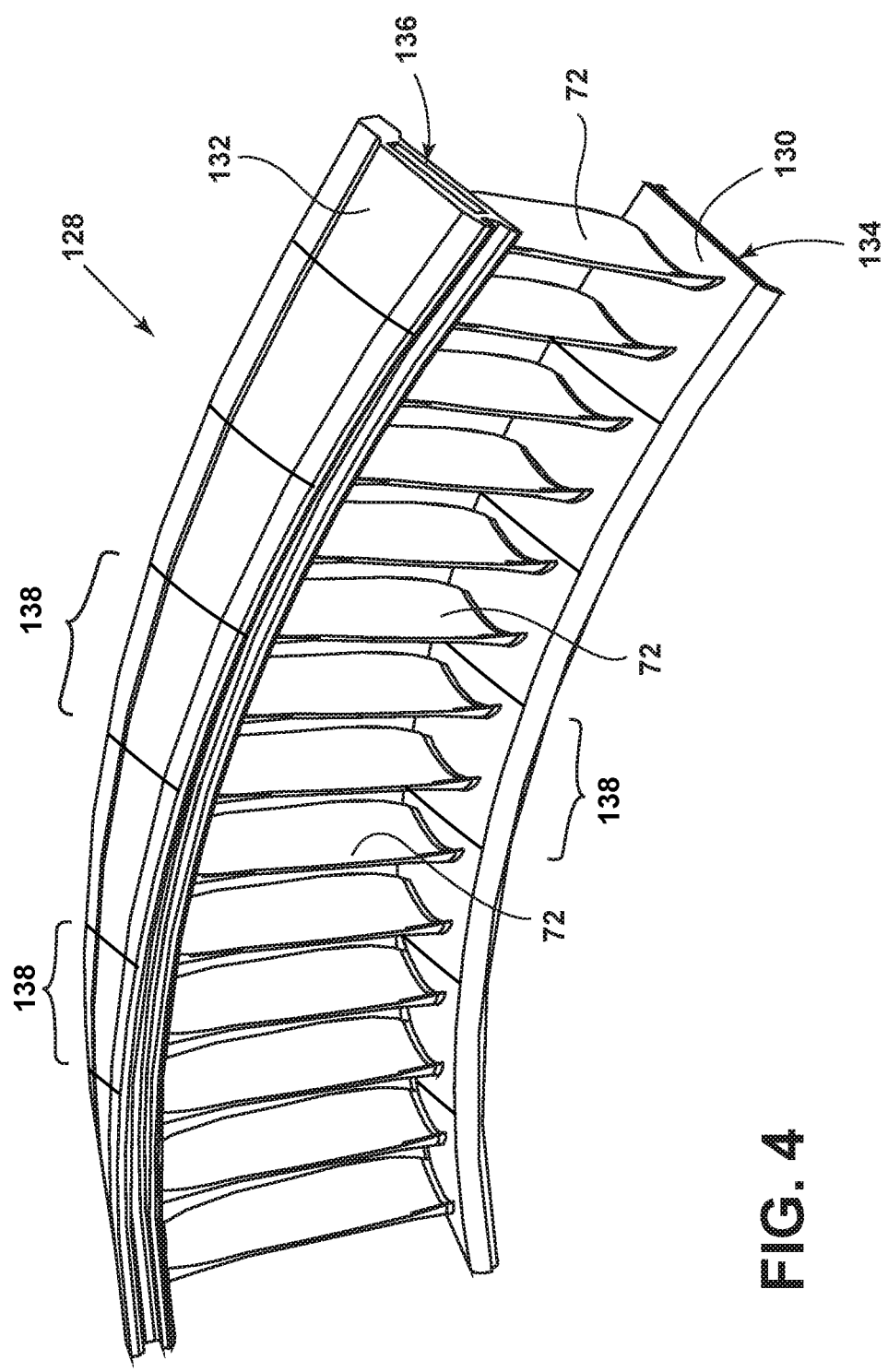
FIG. 4 is a section of a band or turbine vanes of the engine of FIG. 1.

FIG. 4 illustrates a plurality of airfoils 90 arranged in a circumferential vane ring 128 and supported at the root 98 by an arcuate inner band 130 and at the tip 96 an arcuate outer band 132. An inner band channel 134 and an outer band channel 136 can be defined within the inner and outer bands 130, 132, respectively. The band channels 134, 136 can fluidly communicate with one another through interior 120 of the airfoils 90. A set of two adjacent vanes 72 can define a nozzle 138. The entire annular band of vanes 128 can be a combination of multiple nozzles 138. The arcuate section shown in FIG. 3 has a sector angle of approximately 36 degrees and is exemplary an annular vane section. It should be appreciated that there can be any number of vanes 72 defining the respective ring 128. The vanes 72, inner band 130 and outer band 132 can be made from a known material including, but not limited to, titanium alloys, nickel, ceramic matrix composites, and cobalt based alloys.

Figure 5:
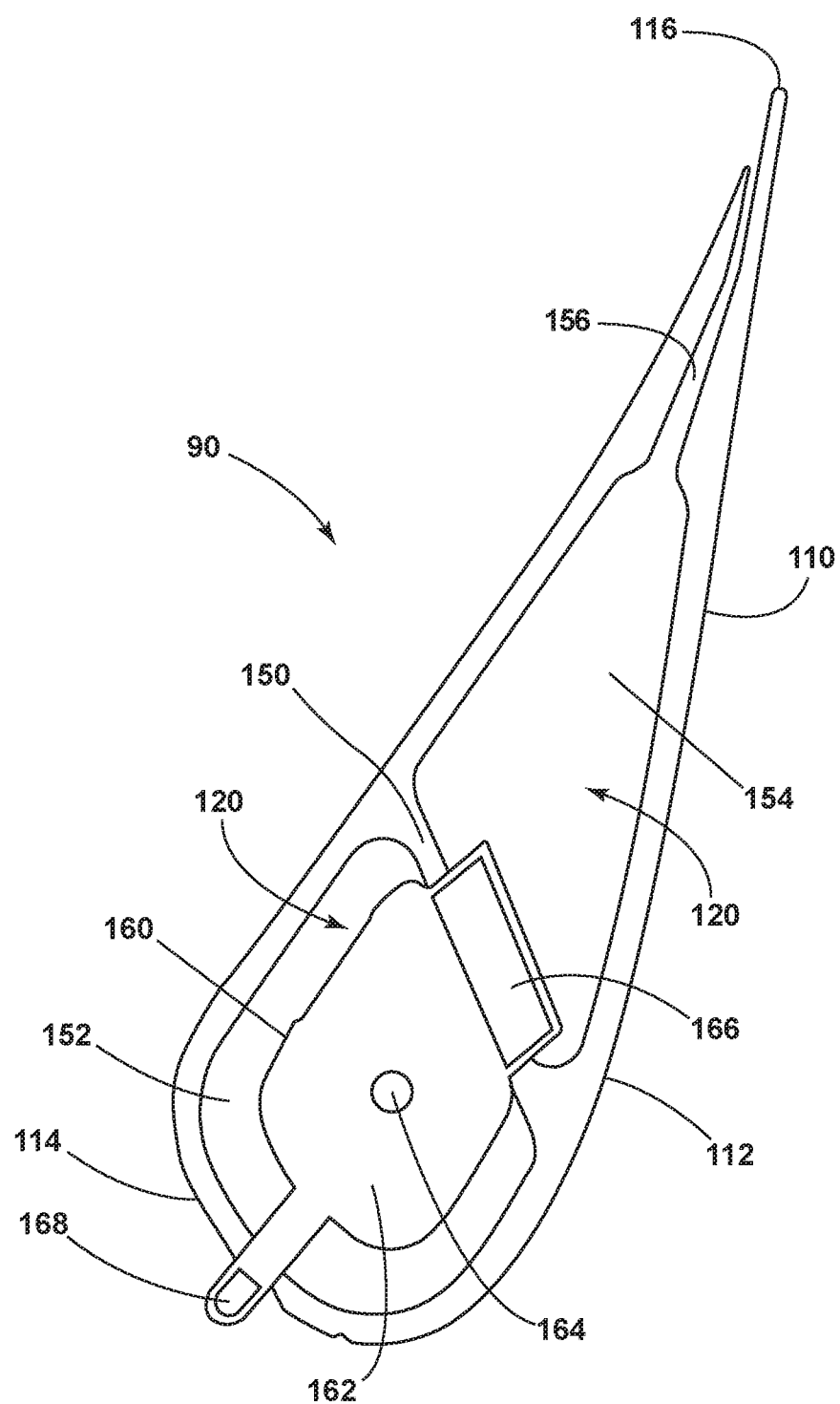
FIG. 5 is a cross-section of the airfoil of FIG. 2 having an accelerator insert.

Looking at FIG. 5, the interior 120 of the airfoil 90 can further include a rib 150 dividing the interior into a first channel 152 and a second channel 154 located adjacent the leading edge 114 and the trailing edge 116 respectively. It should be appreciated that the rib 150 and disposition of the channels 152, 154 is exemplary and the airfoil 90 can have an interior 120 having one or more channels extending at least partially between the tip and the root 96, 98. A trailing edge slot 156 fluidly couples the second channel 154 to the trailing edge 116 for exhausting air within the interior 120 of the airfoil 90.

An accelerator insert 160 can be disposed in one of the channels 152, 154 and is shown as mounted within the first channel 152. The accelerator insert 160 defines an accelerator interior 162 in fluid communication with the first channel 152 through an accelerator aperture 164. The accelerator insert 160 can mount within the channel 152 utilizing at least one tab, illustrated as a rib tab 166 and a wall tab 168. The tabs 166, 168 can mount, for example, within the platform 92 or dovetail 94 so the tabs 166, 168 are not extending into a mainstream airflow within the engine 10. Additionally, the accelerator insert 160 can mount partially along the span-wise length of the rib 150.

Figure 6:
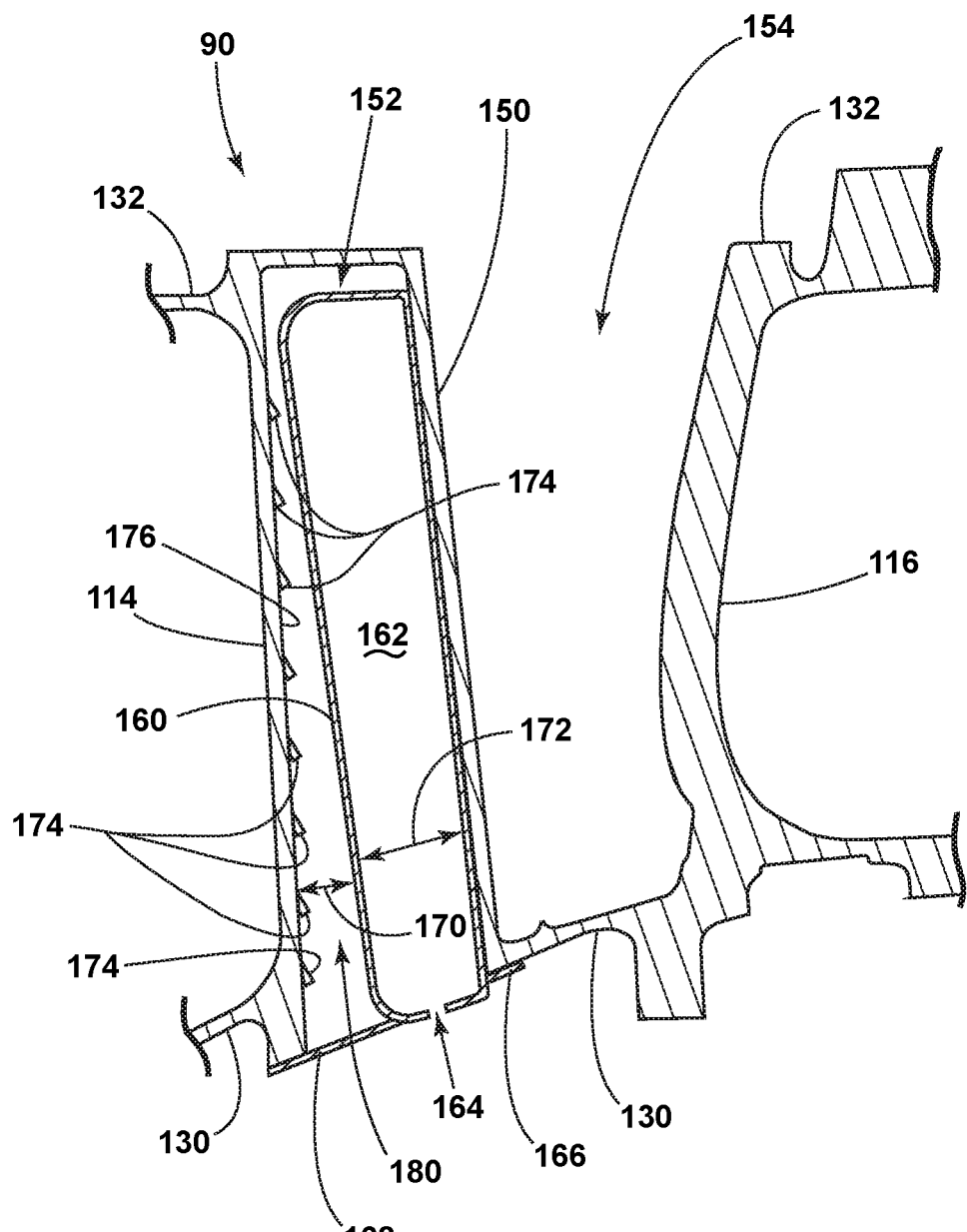
FIG. 6 is an axial cross-section of the airfoil of FIG. 5 having the accelerator insert.

Looking at FIG. 6, the accelerator insert 160 can be mounted along the rib 150 to fill a portion of the cooling air channel 152 to define a decreased cross-sectional area 170 within the first channel 152 in the unfilled portion. While the decreased cross-sectional area 170 is illustrated as continuous along the accelerator insert 160, it can be step-wise, constant, variable, non-continuous, or otherwise in non-limiting examples. Similarly, the accelerator insert 160 can be shaped to have an accelerator cross-sectional area 172. The accelerator cross-sectional area 172 can be constant, increasing, decreasing, variable, or otherwise in non-limiting examples such that the accelerator insert 160 defines the decreased cross-sectional area 170 of the first channel 152. It should be understood that the shape of the first channel 152 or the shape of the accelerator insert 160 can defined to provide the decreased cross-sectional area 170 within the first channel 152. Similarly, a combination of the shapes of the first channel 152 and the accelerator insert 160 can define the decreased cross-sectional area 170.

A plurality of turbulators 174 can be disposed along an inner surface 176 of the first channel 152. The turbulators 174, in non-limiting examples, can be quadrilateral, arcuate, angled, variable, fastback turbulators, or similar known turbulators. The fastback turbulators, for example, can provide for enhanced cooling along the airfoil inner surface while minimizing dust collection.

An airflow passage 180 can be provided to the interior 120 of the airfoil 90, defined by the cooling air channel 152 that is not occupied by the accelerator insert 160. It should be appreciated that the airflow passage 180 can be provided from the radially inner or outer end of the airfoil 90, as may be preferential for the particular airfoil 90. For example, in the case of a vane 72, a flow cooling fluid can be provided from the inner or outer bands 132. Alternatively, in the case of a blade 68, the cooling fluid flow can be provided from the inlet passages 100, 102, 104 at the passage outlets 106.

Figure 7:
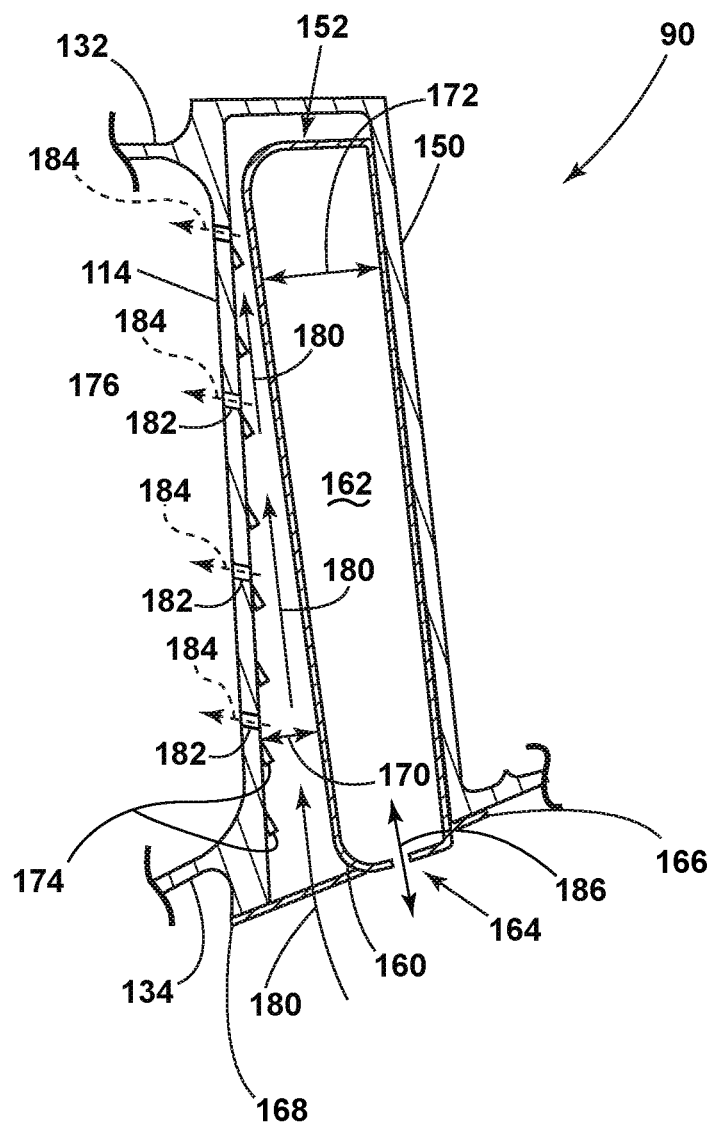
FIG. 7 is an axial cross-section illustrating an airflow within the airfoil adjacent the accelerator insert of FIG. 6.

Looking at FIG. 7, the airflow passage 180 can be provided to the first channel 152 of the airfoil 90 around the wall tab 168, extending only partially across the first channel 152. The cooling fluid flow within the airflow passage 180 is accelerated as it moves along the decreased cross-sectional area 170. The cooling fluid flow can be exhausted through one or more film holes 182 as a film airflow 184 for providing a cooling film along the surface of the airfoil 90.

A portion of the cooling fluid within the airflow passage 180 can pass into the interior 162 of the accelerator insert 160. While the accelerator insert 160 is passive, meaning that an active airflow is not provided through the accelerator insert 160 to another portion of the airfoil 90 or the engine 10, the accelerator aperture 164 permits an airflow 186 to move in and out of the accelerator insert 160 to maintain a proper pressure balance between the accelerator interior 162 and the interior 120 of the airfoil 90.

It should be appreciated that accelerator insert 160 is designed to form converging or decreased cross-sectional area 170 between a wall of the interior 120 of the airfoil 90 and the accelerator insert 160. The decreased cross-sectional area 170 formed by the accelerator insert 160 generates a flow sufficient to maintain a sufficient heat transfer coefficient for cooling of the airfoil 90. Additionally, the use of turbulators 174 such as fastback turbulators can further enhance the heat transfer while minimizing dust collection within the channels 152, 154.

It should be appreciated that application of the disclosed design is not limited to turbine engines with fan and booster sections, but is applicable to turbojets and turbo engines as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
    an outer wall bounding an interior and defining a pressure side and a suction side extending axially between a leading edge and a trailing edge to define a chord-wise direction and extending radially between a root and a tip to define a span-wise direction;
    at least one cooling air channel in the interior extending in the span-wise direction; and
    an accelerator insert including a single aperture and located within and filling a portion of the at least one cooling air channel and leaving an unfilled portion of the at least one cooling air channel that defines an airflow passage, wherein the accelerator insert includes an insert interior having a constant cross-sectional area measured in the chord-wise direction and extending in the span-wise direction, and the at least one cooling air channel is shaped such that the airflow passage of the at least one cooling air channel includes a decreasing cross-sectional area defined by the accelerator insert in the span-wise direction from the root toward the tip to accelerate an airflow through the airflow passage.

2. The airfoil of claim 1 wherein the at least one cooling air channel is multiple cooling air channels.

3. The airfoil of claim 2 wherein the accelerator insert is disposed within at least one of the multiple cooling air channels.

4. The airfoil of claim 3 further comprising a rib extending in the span-wise direction between the root and the tip to at least partially define at least one of the multiple cooling air channels.

5. The airfoil of claim 4 wherein the accelerator insert includes a mounting tab mounted to the rib to mount the accelerator insert to a portion of the rib.

6. The airfoil of claim 1 further comprising at least one turbulator disposed in the airflow passage.

7. The airfoil of claim 6 wherein the at least one turbulator is at least one fastback turbulator.

8. The airfoil of claim 7 wherein the at least one fastback turbulator is disposed on the accelerator insert.

9. The airfoil of claim 7 wherein the at least one fastback turbulator is disposed on the outer wall within the airflow passage.

10. The airfoil of claim 1 wherein the decreasing cross-sectional area is continuous.

11. The airfoil of claim 10 wherein the decreasing cross-sectional area extends continuously in the span-wise extent of the accelerator insert.

12. The airfoil of claim 1 wherein the decreasing cross-sectional area is at least one of step-wise, constant, variable, or non-continuous.

13. The airfoil of claim 1 wherein the airfoil is one of a blade or a vane.

14. A nozzle assembly for a turbine engine, comprising:
an outer band;
an inner band disposed radially relative to the outer band;
at least one vane extending between a leading edge and a trailing edge to define a chord-wise direction, the outer and inner bands defining a span-wise direction, and defining a nozzle with the at least one vane having an interior chamber;
a cooling air channel defined in the interior chamber extending at least partially between the outer and inner bands; and
an accelerator insert including a single aperture and located within and filling a portion of the cooling air channel and leaving an unfilled portion of the cooling air channel that defines an airflow passage, wherein the accelerator insert includes an insert interior having a constant cross-sectional area measured in the chord-wise direction and extending in the span-wise direction, and the cooling air channel is shaped such that the airflow passage of the cooling air channel includes a decreasing cross-sectional area defined by the accelerator insert in a direction from the inner band toward the outer band, extending at least partially between the outer and inner bands to accelerate an airflow through the airflow passage.

15. The nozzle assembly of claim 14 further comprising a rib provided in the interior chamber separating the interior chamber into multiple cooling air channels.

16. The nozzle assembly of claim 15 wherein the accelerator insert is disposed within at least one of the multiple cooling air channels.

17. The nozzle assembly of claim 14 further comprising at least one turbulator disposed in the airflow passage.

18. The nozzle assembly of claim 17 wherein the at least one turbulator is at least one fastback turbulator.

19. The nozzle assembly of claim 18 wherein the at least one fastback turbulator is disposed on the accelerator insert.

20. The nozzle assembly of claim 18 further comprising an outer wall and wherein the at least one fastback turbulator is disposed on the outer wall within the airflow passage.

21. The nozzle assembly of claim 14 wherein the decreasing cross-sectional area is at least one of step-wise, constant, continuous, variable, or non-continuous.

22. An airfoil for a turbine engine, the airfoil comprising:
an outer wall bounding an interior and defining a pressure side and a suction side extending axially between a leading edge and a trailing edge to define a chord-wise direction and extending radially between a root and a tip to define a span-wise direction;
a rib extending through the interior between the pressure side and the suction side, separating the interior into a first channel and a second channel;
a set of turbulators provided along the outer wall in the interior;
a set of film holes provided in the outer wall; and
an accelerator insert having a single aperture, the accelerator insert located within and filling a portion of one of the first channel and the second channel and leaving an unfilled portion of the one of the first channel and the second channel to define an airflow passage, and including a mount tab mounted to one of the rib or the outer wall coupling the accelerator insert to the one of the outer wall or the rib;
wherein the accelerator insert includes a constant cross-sectional area measured in the chord-wise direction and extending in the span-wise direction, and the first channel or the second channel having the accelerator insert is shaped such that the airflow passage of the one of the first channel or the second channel containing the accelerator insert includes a decreasing cross-sectional area in the span-wise direction from the root toward the tip defined by the accelerator insert to accelerate an airflow through the airflow passage.

23. The airfoil of claim 22 further comprising at least one turbulator disposed in the airflow passage.

24. The airfoil of claim 23 wherein the at least one turbulator is at least one fastback turbulator.

25. The airfoil of claim 24 wherein the at least one fastback turbulator is disposed on the accelerator insert.

26. The airfoil of claim 24 wherein the at least one fastback turbulator is disposed on the outer wall within the airflow passage.

27. The airfoil of claim 22 wherein the decreasing cross-sectional area is continuous.

28. The airfoil of claim 27 wherein the decreasing cross-sectional area extends continuously in the span-wise extent of the accelerator insert.

29. The airfoil of claim 22 wherein the decreasing cross-sectional area is at least one of step-wise, constant, variable, or non-continuous.

* * * * *